US008889746B2

(12) United States Patent
Kresnyak

(10) Patent No.: US 8,889,746 B2
(45) Date of Patent: Nov. 18, 2014

(54) ENHANCEMENT OF FISCHER-TROPSCH PROCESS FOR HYDROCARBON FUEL FORMULATION IN A GTL ENVIRONMENT

(75) Inventor: Steve Kresnyak, Calgary (CA)

(73) Assignee: Expander Energy Inc., Calgary (CA)

( * ) Notice: Subject to any disclaimer, the term of this patent is extended or adjusted under 35 U.S.C. 154(b) by 446 days.

(21) Appl. No.: 13/228,042

(22) Filed: Sep. 8, 2011

(65) Prior Publication Data
US 2013/0065974 A1    Mar. 14, 2013

(51) Int. Cl.
*C07C 27/00*    (2006.01)
*C01B 3/38*    (2006.01)
*C10G 2/00*    (2006.01)

(52) U.S. Cl.
CPC ........... *C01B 3/38* (2013.01); *C01B 2203/1241* (2013.01); *C01B 2203/142* (2013.01); *C10G 2/30* (2013.01); *C01B 2203/062* (2013.01); *C01B 2203/0244* (2013.01); *C01B 2203/0435* (2013.01); *C01B 2203/0872* (2013.01); *C01B 2203/143* (2013.01); *C01B 2203/0475* (2013.01); *C01B 2203/0405* (2013.01); *C01B 2203/145* (2013.01); *C01B 2203/1258* (2013.01); *C01B 2203/147* (2013.01); *C01B 3/382* (2013.01); *C01B 2203/0844* (2013.01); *C01B 2203/0233* (2013.01)
USPC ........... 518/700; 518/702; 518/703; 518/704; 518/705

(58) Field of Classification Search
CPC ............. C10G 2/30; C01B 2203/0233; C01B 2203/0244; C01B 2203/0405; C01B 2203/062; C01B 2203/142
USPC ......................................... 518/700, 702–705
See application file for complete search history.

(56) References Cited

U.S. PATENT DOCUMENTS

| | | | |
|---|---|---|---|
| 2,574,469 A | 11/1951 | Dressler et al. | |
| 3,351,563 A | 11/1967 | Negra et al. | |
| 3,941,820 A | 3/1976 | Jackson et al. | |
| 4,217,112 A | 8/1980 | Johanson | |
| 4,234,412 A | 11/1980 | Boersma et al. | |
| 5,378,348 A | 1/1995 | Davis et al. | |
| 5,494,653 A | 2/1996 | Paisley | |
| 6,043,288 A | 3/2000 | DeGeorge et al. | |
| 6,048,449 A | 4/2000 | Bogdan et al. | |
| 6,183,627 B1 | 2/2001 | Friday et al. | |
| 6,241,874 B1 | 6/2001 | Wallace et al. | |
| 6,306,917 B1 | 10/2001 | Bohn et al. | |
| 6,395,944 B1 | 5/2002 | Griffiths et al. | |
| 6,512,018 B2 | 1/2003 | Kennedy | |
| 6,531,516 B2 | 3/2003 | Davis et al. | |
| 6,540,023 B2 | 4/2003 | Davis et al. | |
| RE38,170 E | 7/2003 | DeGeorge et al. | |
| 6,596,780 B2 | 7/2003 | Jahnke et al. | |
| 6,602,404 B2 | 8/2003 | Walsh et al. | |
| 6,656,343 B2 | 12/2003 | Dancuart | |
| 6,693,138 B2 | 2/2004 | O'Rear | |
| 6,696,501 B2 | 2/2004 | Schanke et al. | |
| 6,702,936 B2 | 3/2004 | Rettger et al. | |
| 6,730,285 B2 | 5/2004 | Aasberg-Petersen et al. | |
| 6,765,025 B2 | 7/2004 | Ding et al. | |
| 6,863,802 B2 | 3/2005 | O'Rear et al. | |
| 6,872,753 B2 | 3/2005 | Landis et al. | |
| 6,958,363 B2 | 10/2005 | Espinoza et al. | |
| 7,004,985 B2 | 2/2006 | Wallace et al. | |
| 7,208,530 B2 | 4/2007 | Norbeck et al. | |
| 7,214,720 B2 | 5/2007 | Bayle et al. | |
| 7,381,320 B2 | 6/2008 | Iqbal et al. | |
| 7,407,571 B2 | 8/2008 | Rettger et al. | |
| 7,413,647 B2 | 8/2008 | Calderon et al. | |
| 7,566,394 B2 | 7/2009 | Koseoglu | |
| 7,677,309 B2 | 3/2010 | Shaw et al. | |
| 7,708,877 B2 | 5/2010 | Farshid et al. | |
| 7,749,378 B2 | 7/2010 | Iqbal et al. | |
| 7,776,114 B2 | 8/2010 | Rüger et al. | |
| 7,795,317 B2 | 9/2010 | Eilers et al. | |
| 7,795,318 B2 | 9/2010 | Van Hardeveld | |
| 7,846,979 B2 | 12/2010 | Rojey et al. | |
| 7,855,235 B2 | 12/2010 | Van Hardeveld | |
| 7,863,341 B2 | 1/2011 | Routier | |
| 7,879,919 B2 | 2/2011 | Ernst et al. | |
| 2001/0051662 A1 | 12/2001 | Arcuri et al. | |
| 2004/0181313 A1 | 9/2004 | Mohedas et al. | |
| 2005/0113464 A1* | 5/2005 | O'Rear et al. | 518/702 |
| 2005/0250862 A1 | 11/2005 | Bayle et al. | |
| 2006/0167118 A1 | 7/2006 | Tijm et al. | |
| 2006/0231455 A1 | 10/2006 | Olsvik et al. | |
| 2008/0021119 A1 | 1/2008 | Norbeck et al. | |
| 2008/0021122 A1 | 1/2008 | Norbeck et al. | |
| 2008/0115415 A1 | 5/2008 | Agrawal et al. | |
| 2008/0116111 A1 | 5/2008 | Newton | |
| 2009/0084707 A1 | 4/2009 | Gil | |

(Continued)

FOREIGN PATENT DOCUMENTS

| | | |
|---|---|---|
| CA | 2320509 | 8/1999 |
| CA | 2595880 | 12/2005 |
| CA | 2657656 | 1/2008 |
| CA | 2731376 | 6/2010 |
| CA | 2737872 | 4/2011 |
| EP | 1608924 | 9/2007 |

* cited by examiner

*Primary Examiner* — Jafar Parsa

(74) *Attorney, Agent, or Firm* — MBM Intellectual Property Law, LLP

(57) ABSTRACT

An enhanced Fischer-Tropsch process for the synthesis of sulfur free, clean burning, hydrocarbon fuels, examples of which include syndiesel and aviation fuel. Naphtha is destroyed in a syngas generator and recycled as feedstock to an Fischer-Tropsch (FT) reactor in order to enhance the production of syndiesel from the reactor. The process enhancement results is the maximum production of formulated syndiesel without the formation of low value by-products.

21 Claims, 6 Drawing Sheets

(56) References Cited

U.S. PATENT DOCUMENTS

| | | |
|---|---|---|
| 2009/0200209 A1 | 8/2009 | Sury et al. |
| 2009/0261587 A1* | 10/2009 | Lomax et al. ............ 290/7 |
| 2009/0292571 A1 | 11/2009 | Gil et al. |
| 2010/0000153 A1 | 1/2010 | Kurkjian et al. |
| 2010/0036181 A1 | 2/2010 | Diebold et al. |
| 2010/0113624 A1 | 5/2010 | Routier |
| 2010/0137458 A1 | 6/2010 | Erling |
| 2010/0144905 A1 | 6/2010 | Reaveley et al. |
| 2010/0216898 A1 | 8/2010 | Tonseth et al. |
| 2011/0009501 A1 | 1/2011 | Ernst |
| 2011/0049016 A1 | 3/2011 | McGrady et al. |
| 2012/0208902 A1* | 8/2012 | Kresnyak et al. ............ 518/702 |

ENHANCEMENT OF FISCHER-TROPSCH PROCESS FOR HYDROCARBON FUEL FORMULATION IN A GTL ENVIRONMENT

TECHNICAL FIELD

The present invention relates to the modification of the Fischer-Tropsch sequence of operations including the Fischer-Tropsch process for the production of hydrocarbon fuels in an efficient manner.

BACKGROUND OF THE INVENTION

In the prior art, the Fischer-Tropsch process has been used for decades to assist in the formulation of hydrocarbons. In the last several years, this has become a concern giving the escalating environmental concerns regarding pollution together with the increasing costs of hydrocarbon exploration and refining. The major producers in this area have expanded the art significantly in this technological area with a number of patented advances and pending applications in the form of publications.

In the art, advances made in terms of the raw materials that have been progenitor materials for the Fischer-Tropsch process, have included, for example, coal-to-liquid (CTL), bio-to-liquid (BTL) and gas-to-liquid (GTL). One of the more particularly advantageous features of the gas-to-liquid (GTL) technology is the fact that it presents a possibility to formulate a higher value environmentally beneficial synthetic diesel product or syndiesel from stranded natural gas reserves, which would otherwise have not been commercially feasible to bring to market. As is generally known, the Fischer-Tropsch (FT) process converts hydrogen and carbon monoxide (commonly known as syngas) into liquid hydrocarbon fuels, examples of which include synthetic diesel, naphtha, kerosene, aviation or jet fuel and paraffinic wax. As a precursory step, the natural gas is thermally converted using heat and pressure in the presence of catalyst to produce a hydrogen rich syngas containing hydrogen and carbon monoxide. As a result of the Fischer-Tropsch technique, the synthetic fuels are very appealing from an environmental point of view, since they are paraffinic in nature and substantially devoid of contamination. This is particularly true in the case of the diesel fuel synthesis where the synthetic product has ideal properties for diesel engines, including extremely high cetane rating>70, negligible aromatics and sulphur content, in addition to enabling optimum combustion and virtually emission free operation. Synthetic diesel or syndiesel fuels significantly reduce nitrous oxide and particulate matter when compared with petroleum based diesel fuel.

One example of recent advances that have been made in this area of technology includes the features taught in U.S. Pat. No. 6,958,363, issued to Espinoza, et al., Oct. 25, 2005. In the document, Espinoza et al. provide for hydrogen use in a GTL plant.

In essence, the patent teaches a process for synthesizing hydrocarbons where initially, a synthesis gas stream is formulated in a syngas generator. The synthesis gas stream comprises primarily hydrogen and carbon monoxide. The process involves catalytically converting the synthesis gas stream in a synthesis reaction to produce hydrocarbons and water followed by the generation of hydrogen-rich stream in the hydrogen generator. The process indicates that the hydrogen generator is separate from the syngas generator (supra) and that the hydrogen generator comprises either a process for converting hydrocarbons to olefins, a process for catalytically dehydrogenating hydrocarbons, or a process for refining petroleum, and a process for converting hydrocarbons to carbon filaments. The final step in the process in its broadest sense, involves consumption of hydrogen from the hydrogen-rich stream produced in one or more processes that result and increase value of the hydrocarbons or the productivity of the conversion of the hydrocarbons from the earlier second mentioned step.

Although a useful process, it is evident from the disclosure of Espinoza et al. that there is a clear intent to create olefins such as ethylene and propylene for petrochemical use, and aromatics for gasoline production. Additionally, there is a reforming step indicated to include the reformation of naphtha feedstock to generate a net surplus hydrogen by-product which is then recombined into the process. The naphtha is subsequently converted to aromatics for high octane gasoline blend stock. There is no specific contemplation and therefore no discussion of effectively destroying the naphtha for purposes of enhancing the Fischer-Tropsch process which, in turn, results in the significant augmentation of hydrocarbon synthesis.

The Espinoza et al. process is an excellent gas to a liquid process link to gasoline production from natural gas using naphtha reformation to make the gasoline product. In the disclosure, it was discovered that the excess hydrogen could be used to enhance the productivity of conversion.

A further significant advancement in this area of technology is taught by Bayle et al., in U.S. Pat. No. 7,214,720, issued May 8, 2007. The reference is directed to the production of liquid fuels by a concatenation of processes for treatment of a hydrocarbon feedstock.

It is indicated in the disclosure that the liquid fuels begin with the organic material, typically biomass as a solid feedstock. The process involves a stage for the gasification of the solid feedstock, a stage for purification of synthesis gas and subsequently a stage for transformation of the synthesis gas into a liquid fuel.

The patentees indicate in column 2 the essence of the technology:

"A process was found for the production of liquid fuels starting from a solid feedstock that contains the organic material in which:
a) The solid feedstock is subjected to a gasification stage so as to convert said feedstock into synthesis gas comprising carbon monoxide and hydrogen,
b) the synthesis gas that is obtained in stage a) is subjected to a purification treatment that comprises an adjustment for increasing the molar ratio of hydrogen to carbon monoxide, $H_2/CO$, up to a predetermined value, preferably between 1.8 and 2.2,
c) the purified synthesis gas that is obtained in stage b) is subjected to a conversion stage that comprises the implementation of a Fischer-Tropsch-type synthesis so as to convert said synthesis gas into a liquid effluent and a gaseous effluent,
d) the liquid effluent that is obtained in stage c) is fractionated so as to obtain at least two fractions that are selected from the group that consists of: a gaseous fraction, a naphtha fraction, a kerosene fraction, and a gas oil fraction, and
e) at least a portion of the naphtha fraction is recycled in gasification stage."

Although a meritorious procedure, the overall process does not result in increased production of hydrocarbons. The naphtha recycle stream that is generated in this process is introduced into the gasification stage. This does not directly augment the syngas volume to the Fischer-Tropsch reactor which results in increased volumes of hydrocarbons being produced giving the fact that the feedstock is required for the process. To introduce the naphtha to the gasification stage as taught in Bayle et al., is to modify the $H_2/CO$ ratio in the gasification stage using an oxidizing agent such as water vapour and gaseous hydrocarbon feedstocks such as natural gas with the recycled naphtha, while maximizing the mass rate of carbon monoxide and maintain sufficient temperature above 1000° C. to 1500° C. in the gasification stage to maximize the conversion of tars and light hydrocarbons.

In U.S. Pat. No. 6,696,501, issued Feb. 24, 2004, to Schanke et al., there is disclosed an optimum integration process for Fischer-Tropsch synthesis and syngas production.

Among other features, the process instructs the conversion of natural gas or other fossil fuels to higher hydrocarbons where the natural gas or the fossil fuels is reacted with steam and oxygenic gas in a reforming zone to produce synthesis gas which primarily contains hydrogen, carbon monoxide and carbon dioxide. The synthesis gas is then passed into a Fischer-Tropsch reactor to produce a crude synthesis containing lower hydrocarbons, water and non-converted synthesis gas. Subsequently, the crude synthesis stream is separated in a recovery zone into a crude product stream containing heavier hydrocarbons, a water stream and a tail gas stream containing the remaining constituents. It is also taught that the tail gas stream is reformed in a separate steam reformer with steam and natural gas and then the sole reformed tail gas is introduced into the gas stream before being fed into the Fischer-Tropsch reactor.

In the reference, a high carbon dioxide stream is recycled back to an ATR in order to maximize the efficiency of the carbon in the process. It is further taught that the primary purpose of reforming and recycling the tail gas is to steam reform the lower hydrocarbons to carbon monoxide and hydrogen and as there is little in the way of light hydrocarbons, adding natural gas will therefore increase the carbon efficiency. There is no disclosure regarding the destruction of naphtha in an SMR or ATR to generate an excess volume of syngas with subsequent recycle to maximize hydrocarbon production. In the Schanke et al. reference, the patentees primarily focused on the production of the high carbon content syngas in a GTL environment using an ATR as crude synthesis stream and reforming the synthesis tail gas in an SMR with natural gas addition to create optimum conditions that feed to the Fischer-Tropsch reactor.

In respect of other progress that has been made in this field of technology, the art is replete with significant advances in, not only gasification of solid carbon feeds, but also methodology for the preparation of syngas, management of hydrogen and carbon monoxide in a GTL plant, the Fischer-Tropsch reactors management of hydrogen, and the conversion of biomass feedstock into hydrocarbon liquid transportation fuels, inter alia. The following is a representative list of other such references. This includes: U.S. Pat. Nos. 7,776,114; 6,765,025; 6,512,018; 6,147,126; 6,133,328; 7,855,235; 7,846,979; 6,147,126; 7,004,985; 6,048,449; 7,208,530; 6,730,285; 6,872,753, as well as United States Patent Application Publication Nos. US2010/0113624; US2004/0181313; US2010/0036181; US2010/0216898; US2008/0021122; US 2008/0115415; and US 2010/0000153.

SUMMARY OF THE INVENTION

One object of the present invention is to provide an improved Fischer-Tropsch based synthesis process for synthesizing hydrocarbons with a substantially increased yield.

In one embodiment of the present invention there is provided a process for synthesizing hydrocarbons, comprising:

a) formulating a hydrogen rich stream with a syngas generator;
b) catalytically converting said stream to produce hydrocarbons, containing at least naphtha;
c) recycling at least a portion of said naphtha to said syngas generator to form an enhanced hydrogen rich stream; and
d) re-circulating said enhanced hydrogen rich stream from step (c) for conversion in step (b) to enhance the synthesis of hydrocarbons.

The present technology provides a very elegant solution to ameliorate the shortcomings that have been clearly evinced in the prior art references. Despite the fact that the prior art, in the form of patent publications, issued patents, and other academic publications, all recognize the usefulness of a Fischer-Tropsch process, steam methane reforming, autothermal reforming, naphtha recycle, and other processes, the prior art when taken individually or when mosaiced is deficient a process that provides for the synthesis of a hydrogen rich stream in a syngas generator and reaction in a Fischer-Tropsch or suitable reactor for the purpose of enhancing the production of, as one example, diesel fuel or aviation fuel. As is well known, the Fischer-Tropsch process is particularly useful since the resultant synthetic fuel is "clean" fuel and does not have the contamination level typically associated with the same petroleum based fuel.

The present invention amalgamates, in a previously unrecognized combination, a series of known unit operations into a much improved synthesis route for production of synthetic hydrocarbon fuels and incorporating the context of Applicant's co-pending application Ser. Nos. xxx and xxx, filed xxx and xxx, respectively. This process engages a counter-intuitive step, namely, the removal of a production fraction, namely the naphtha, which, despite being a refined product, is then effectively destroyed making use of the naphtha as a feedstock for a syngas generator and then recycled into the Fischer-Tropsch process. This keystone unit operation is propitious since it works in concert with all of the other precursor operations which, of their own right, are highly effective.

It has been discovered that by employing the naphtha product fraction as a recycled feedstock to the syngas generator, shown in the example and discussed hereinafter in greater detail, as an autothermal reformer (ATR) or steam methane reformer (SMR) or combination thereof, results in an increase in the volume of diesel, or as it is more effectively referred to in the art, as syndiesel.

In accordance with an embodiment of the instant methodology, the process may include an autothermal reforming unit (ATR) operation as a syngas generator. As is well known to those skilled in the art, autothermal reforming employs carbon dioxide and oxygen, or steam, in a reaction with light hydrocarbon gases like natural gas to form syngas. This is an exothermic reaction in view of the oxidation procedure. When the autothermal reformer employs carbon dioxide, the hydrogen to carbon monoxide ratio produced is 1:1 and when the autothermal reformer uses steam, the ratio produced is approximately 2.5:1. One of the more significant benefits of using the ATR is realized in the variability of the hydrogen to carbon monoxide ratio.

The reactions that are incorporated in the autothermal reformer are as follows:

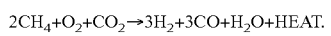

When steam is employed, the reaction equation is as follows:

In accordance with a further embodiment of the instant methodology, the process may include a steam methane reformer (SMR) operation as a syngas generator. As is well known to those skilled in the art, steam methane reforming employs steam in a reaction with light hydrocarbon gases like natural gas and pre-reformed naphtha to form syngas in an indirect fired heater configuration. This is an endothermic reaction where external heat energy is required to support the reaction.

The primary reaction that is incorporated in the steam methane reformer is as follows:

With the steam methane reformer, the hydrogen to carbon monoxide ratio produced ranges from 3:1 to 5:1. One of the more significant benefits of using the SMR is realized in the capability of generating relatively high hydrogen to carbon monoxide ratios, particularly attractive where excess hydrogen is needed for other operations, such as for the hydrocarbon upgrader.

A further discovery materialized from making use of, for example, light hydrocarbon gas as by-product from the Fischer-Tropsch reaction and hydrocarbon upgrader processing, commonly known as FT Tailgas and Upgrader offgases, or combined to form a refinery fuel gas, as a recycled feedstock to the ATR, SMR or combination thereof together with the naphtha recycle feedstock, resulted in a significant increase in the volume of syndiesel fuel produced. By way of example, by employing the combination of SMR and ATR with naphtha recycle, and the recycled refinery fuel gases, the process is capable of converting at least 50% or greater of all the carbon introduced to the process to syndiesel with an increase in production of syndiesel and synthetic jet fuel, as compared to conventional Fischer-Tropsch operation and without the production of any hydrocarbon by-products. This obviously has significant economic benefits.

Accordingly, a further object of one embodiment of the present invention is to provide a process for synthesizing hydrocarbons, comprising the steps of:
  providing a source of hydrocarbons at least containing naphtha,
  recycling the naphtha to a syngas generator to form hydrogen rich stream; and
  catalytically converting the hydrogen rich stream to synthesize hydrocarbons.

In accordance with a further object of one embodiment of the present invention, there is provided an improved gas to liquids circuit, the improvement comprising:
  recycling formed naphtha to said syngas generator to form a hydrogen rich stream with subsequent catalytic conversion.

Copious advantages flow from practicing the technology of this application, exemplary of which are:
  a) high quality diesel product or additive;
  b) high quality diesel and jet fuel with an absence of sulfur;
  c) absence of petroleum by-products or low value feedstocks such as naphtha;
  d) low emission and clean burning diesel and jet fuel;
  e) increased cetane rating with concomitant augmented performance; and
  f) significant volume output of diesel/jet fuel compared to conventional processes using a Fischer-Tropsch reactor.

Referring now to the drawings as they generally describe the invention, reference will now be made to the accompanying drawings illustrating preferred embodiments.

BRIEF DESCRIPTION OF THE DRAWINGS

The dashed lines used in the Figures denote optional operations.

Similar numerals employed in the figures denote similar elements.

DETAILED DESCRIPTION OF THE PREFERRED EMBODIMENTS

Figure 1:
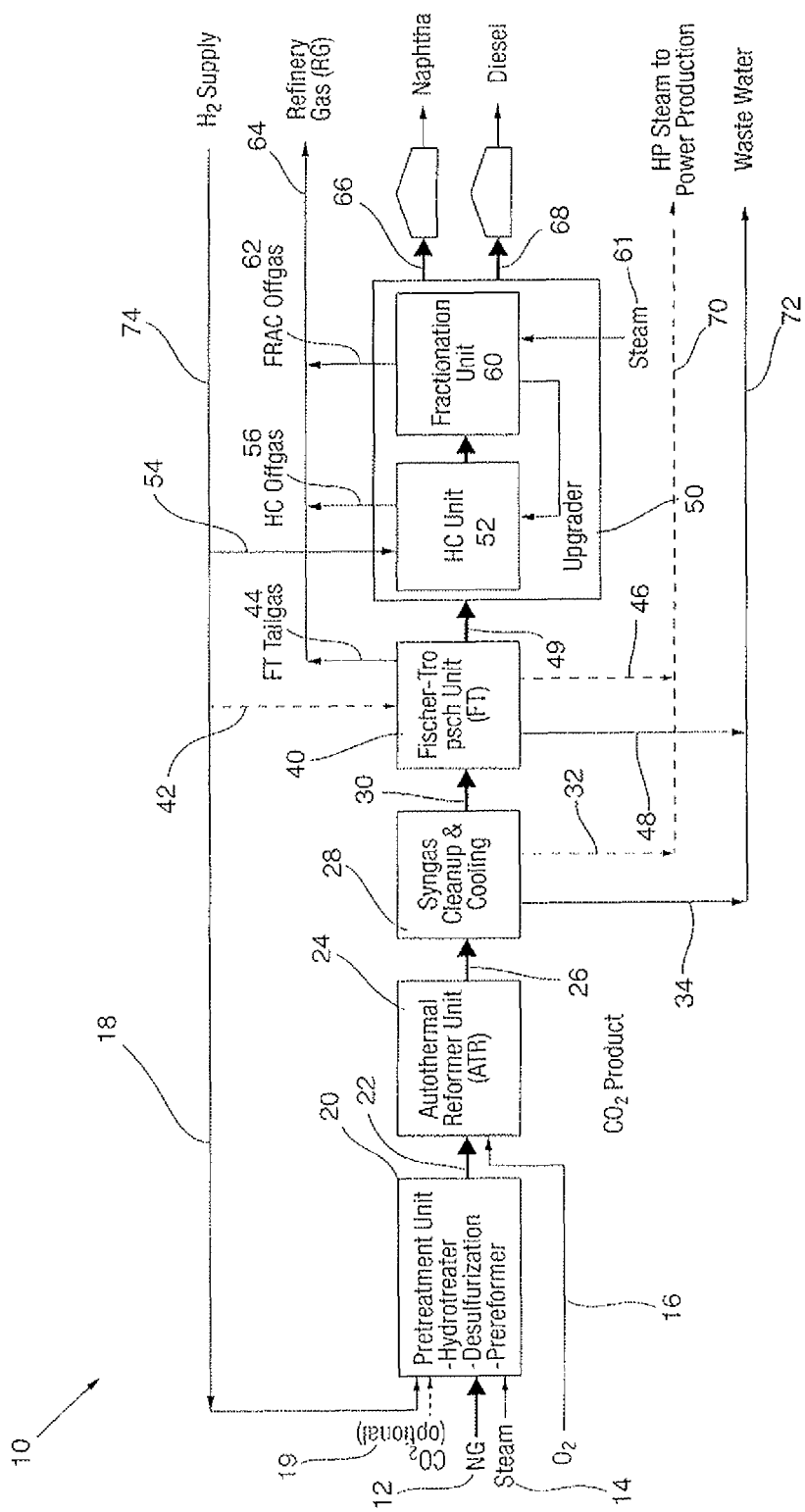
FIG. 1 is a process flow diagram of methodology known in the prior art using autothermal reformer technology.

Referring now to FIG. 1, to illustrate prior art, shown is a process flow diagram of a circuit for converting gas-to-liquids with the result being the production of naphtha and syndiesel. The process is generally denoted by numeral 10 and begins with a natural gas supply 12, which feedstock can be in the form of raw field gas or pipeline quality treated gas, usually with bulk sulfur and hydrocarbon liquids removed. The natural gas is then pre-treated in a pre-treatment unit 20 to which steam 14, hydrogen 18 and optionally carbon dioxide 19 may be added as required. The pre-treatment unit may include, as is well known to those skilled in the art, such unit operations as a feed gas hydrotreater, sulfur removal and guard operation and a pre-reformer to produce a clean vapour feed stream 22 for the syngas generator, denoted in FIG. 1 as an autothermal reformer (ATR) unit 24. The ATR 24 may be any suitable catalytic partial oxidization unit, however, as an example; an ATR that is useful in this process is that of Haldor Topsoe A/S., Uhde GmbH and CB&I Lummus Company. The ATR process and apparatus have been found to be effective in the methodology of the present invention and will be discussed hereinafter.

Generally, as is known from the ATR process, the same effectively involves a thermal catalytic stage which uses an partial oxygen supply 16 to convert the preconditioned natural gas feed to a syngas 26 containing primarily hydrogen and carbon monoxide.

The so formed syngas is then subjected to cooling and cleaning operations 28 with subsequent production of steam 32 and removal of produced water at 34. Common practice in the prior art is to employ the use of a water gas shift reaction (WGS) on the clean syngas 30 to condition the hydrogen to carbon dioxide ratio to near 2.0:1 for optimum conditions for the Fischer-Tropsch unit 40. It is not preferred in this process to include a WGS reaction as all the carbon, primarily as CO is used to maximize production of synthesis liquids product. The process may optionally use the supplemental addition of hydrogen 42 to maximize the conversion to syndiesel. The raw syngas may be further treated, as is well known to those skilled in the art, in various steps of scrubbing units and guard units to remove ammonia and sulfur compounds to create a relatively pure clean syngas 30 suitable for use in a Fischer-Tropsch unit. A carbon dioxide removal unit (not shown) may optionally be included in the clean syngas stream 30 to reduce the inert load and maximize the carbon monoxide concentration to the Fischer-Tropsch unit 40. The syngas is then transferred to a Fischer-Tropsch reactor 40 to produce the hydrocarbons and water. The so formed hydrocarbons are then passed on to a product upgrader, generally denoted as 50, and commonly including a hydrocarbon cracking stage 52, a product fractionating stage 60 with naphtha being produced at 66 as a fraction, as well as diesel 68 as an additional product. The diesel 68 formulated in this process is commonly known as syndiesel. As an example, this process results in the formulation of 1000 barrels per day (bbl/day) based on 10 to 15 thousand standard cubic feet/day (MSCFD) of natural gas. As is illustrated in the flow diagram, a source of hydrogen 74 is to be supplemented to the hydrocarbon cracking unit 52 denoted as streams 54. Further, energy 32 from the syngas generator 24, typically in the form of steam, may be used to generate power and this is equally true of the Fischer-Tropsch reactor 40 creating energy 46.

Table 1 establishes a comparison between FT diesel and conventional petroleum based diesel.

TABLE 1

Specification of FT-diesel in comparison to conventional diesel

| Diesel Fuel Specification | FT-Diesel | Conventional Diesel |
|---|---|---|
| Chemical formula | Paraffin | $C_{12}H_{26}$ |
| Molecular weight (kg/kmol) | | 170-200 |
| Cetane number | >74 | 50 |
| Density (kg/l) at 15° C. | 0.78 | 0.84 |
| Lower Heating Value (MJ/kg) at 15° C. | 44.0 | 42.7 |
| Lower Heating Value (MJ/l) at 15° C. | 34.3 | 35.7 |
| Stoichiometric air/fuel ratio (kg air/kg fuel) | | 14.53 |
| Oxygen content (% wt) | ~0 | 0-0.6 |
| Kinematic viscosity ($mm^2$/s) at 20° C. | 3.57 | 4 |
| Flash point (° C.) | 72 | 77 |

Source: KMITL Sci. Tech. J. Vol. 6 No. 1 January-June 2006, p. 43

As a further benefit, known to those skilled in the art, the process as described by FIG. 1 and all configurations of the current invention, the addition of a further side stripper column (not shown) off the fractionation in stage 60 may be included to produce a new fraction of about 25% of the volume of the syndiesel fuel (200 to 300 barrels per day (bbl/day)), referred to as FT-jet fuel. Table 2 describes a typical characteristic of FT jet fuel.

TABLE 2

Typical Specification of FT-Jet Fuel

| Typical Product Specification | FT Jet Fuel |
|---|---|
| Acidity mg KOH/g | 0.10 |
| Aromatics % vol max | <25.0 |
| Sulfur mass % | <0.40 |
| Distillation ° C. | Min 125° C. max 190° C. |
| 50% recovered | 270° C. |
| End Point | |
| Vapor Pressure kPa max | 21 |
| Flash Point ° C. | — |
| Density 15° C., kg/m3 | 750-801 |
| Freezing Point ° C. max | −51 |
| Net Heat Combustion MJ/kg min | 42.8 |
| Smoke Point mm, min | 20 |
| Naphthalenes vol % max | <3.0 |
| Copper Corrosion 2 hr @ 100° C., max rating | No 1 |
| Thermal Stability | |
| Filter Pressure drop mm Hg, max | 25 |
| Visual Tube rating, max | <3 |
| Static Test 4 hr @ 150° C. mg/100 ml, max | — |
| Existent Gum mg/100 ml, max | — |

Naphtha 66 can be generally defined as a distilled fraction of the Fischer-Tropsch FT hydrocarbon liquids, categorized by way of example with a typical boiling range of 30° C. to 200° C., and more preferred 80° C. to 120° C. The specific naphtha specification will be optimized for each application to maximize syndiesel production, maximize the recovery of light liquid hydrocarbon fractions such as propane and butane and partially or fully eliminate the naphtha by-product.

Suitable examples of FT reactors include fixed bed reactors, such as tubular reactors, and multiphase reactors with a stationary catalyst phase and slurry-bubble reactors. In a fixed bed reactor, the FT catalyst is held in a fixed bed contained in tubes or vessels within the reactor vessel. The syngas flowing through the reactor vessel contacts the FT catalyst contained in the fixed bed. The reaction heat is removed by passing a cooling medium around the tubes or vessels that contain the fixed bed. For the slurry-bubble reactor, the FT catalyst particles are suspended in a liquid, e.g., molten hydrocarbon wax, by the motion of bubbles of syngas sparged into the bottom of the reactor. As gas bubbles rise through the reactor, the syngas is absorbed into the liquid and diffuses to the catalyst for conversion to hydrocarbons. Gaseous products and unconverted syngas enter the gas bubbles and are collected at the top of the reactor. Liquid products are recovered from the suspending liquid using different techniques such as separators, filtration, settling, hydrocyclones, and magnetic techniques. Cooling coils immersed in the slurry remove heat generated by the reaction. Other possibilities for the reactor will be appreciated by those skilled.

In the FT process, $H_2$ and CO combine via polymerization to form hydrocarbon compounds having varying numbers of carbon atoms. Typically 70% conversion of syngas to FT liquids takes place in a single pass of the FT reactor unit. It is also common practice to arrange the multiple FT reactors in series and parallel to achieve conversion levels of 90+%. A supplemental supply of hydrogen 42 may be provided to each subsequent FT reactor stages to enhance the conversion performance of the subsequent FT stages. After the FT reactor, products are sent to the separation stage, to divert the unconverted syngas and light hydrocarbons (referred to as FT tailgas), FT water and the FT liquids, which are directed to the hydrocarbon upgrader unit denoted as 50. The FT tailgas becomes the feed Stream for subsequent FT stages or is directed to refinery fuel gas in the final FT stage. The upgrader unit typically contains a hydrocracking step 52 and a fractionation step 60.

Hydrocracking denoted as 52 used herein is referencing the splitting an organic molecule and adding hydrogen to the resulting molecular fragments to form multiple smaller hydrocarbons (e.g., $C_{10}H_{22}+H_2 \rightarrow C_4H_{10}$ and skeletal isomers+$C_6H_{14}$). Since a hydrocracking catalyst may be active in hydroisomerization, skeletal isomerization can occur during the hydrocracking step. Accordingly, isomers of the smaller hydrocarbons may be formed. Hydrocracking a hydrocarbon stream derived from Fischer-Tropsch synthesis preferably takes place over a hydrocracking catalyst comprising a noble metal or at least one base metal, such as platinum, cobalt-molybdenum, cobalt-tungsten, nickel-molybdenum, or nickel-tungsten, at a temperature of from about 550° F. to about 750° F. (from about 288° C. to about 400° C.) and at a hydrogen partial pressure of about 500 psia to about 1,500 psia (about 3,400 kPa to about 10,400 kPa).

The hydrocarbons recovered from the hydrocracker are further fractionated in the fractionation unit 60 and refined to contain materials that can be used as components of mixtures known in the art such as naphtha, diesel, kerosene, jet fuel, lube oil, and wax. The combined unit consisting of the hydrocracker 52 and hydrocarbon fractionator 60 are commonly known as the hydrocarbon upgrader 50. As is known by those skilled in the art, several hydrocarbon treatment methods can form part of the upgrader unit depending on the desired refined products, such as additional hydrotreating or hydroisomerization steps. The hydrocarbon products are essentially free of sulfur. The diesel may be used to produce environmentally friendly, sulfur-free fuel and/or blending stock for diesel fuels by using as is or blending with higher sulfur fuels created from petroleum sources.

Unconverted vapour streams, rich in hydrogen and carbon monoxide and commonly containing inert compounds such as carbon dioxide, nitrogen and argon are vented from the process as FT tail gas 44, hydrocracker (HC) offgas 56 and fractionator (frac) offgas 62. These streams can be commonly collected as refinery fuel gas 64 and used as fuel for furnaces and boilers to offset the external need for natural gas. These streams may also be separated and disposed of separately based on their unique compositions, well known to those skilled in the art.

A supplemental supply of hydrogen 74 may be required for the HC unit 54 and the natural gas hydrotreater 18. This hydrogen supply can be externally generated or optionally provided from the syngas stream 30 using a pressure swing absorption or membrane unit (not shown), although this feature will increase the volume of syngas required to be generated by the syngas generator 24.

Further, useable energy commonly generated as steam from the syngas stage, denoted by numeral 32, may be used to generate electric power. This is equally true of useable energy that can be drawn from the Fischer-Tropsch unit, owing to the fact that the reaction is very exothermic and this represents a useable source of energy. This is denoted by numeral 46.

Figure 2:
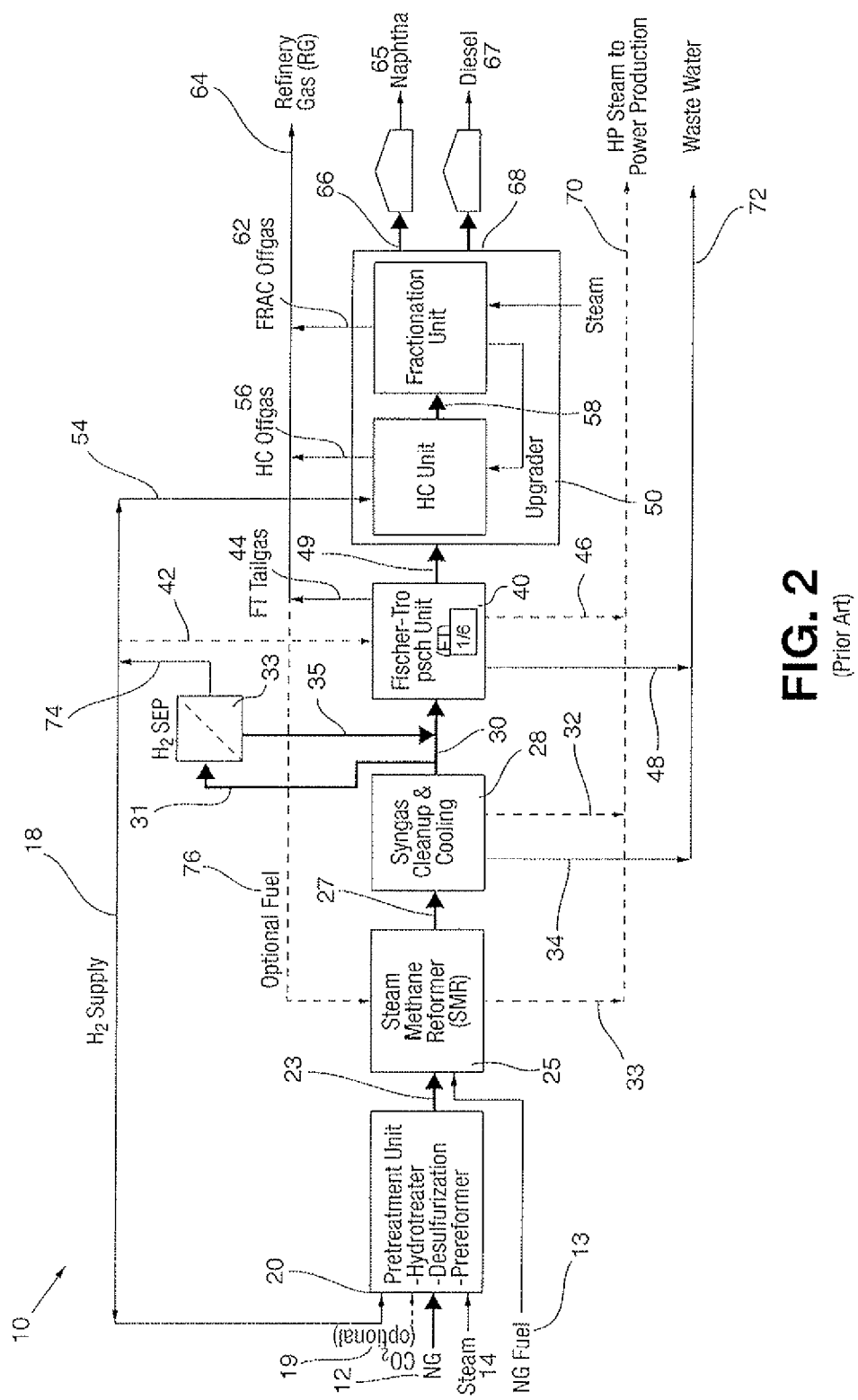
FIG. 2 is a process flow diagram of methodology known in the prior art using steam methane reformer technology.

Referring now to FIG. 2, to further illustrate the prior art, shown is an alternate process flow diagram of a circuit for converting gas-to-liquids with the result being the production of naphtha and syndiesel. The components of this process are generally the same as that described in FIG. 1 with the common elements denoted with the same numbers. For this process, the syngas generator is changed to be a steam methane reformer (SMR) 25. The SMR 25 may be any suitable catalytic conversion unit, however, as an example, an SMR that is useful in this process is that of Haldor Topsoe A/S., Uhde GmbH., CB&I Lummus Company, Lurgi GmbH/Air Liquide Gruppe, Technip Inc, Foster Wheeler and others. The SMR process and apparatus have been found to be effective in executing the methodology of the present invention to be discussed hereinafter. Generally, as is known from the SMR process, the same effectively involves a thermal catalytic stage which uses steam supply and heat energy to convert the preconditioned natural gas feed to a syngas 27 containing primarily hydrogen and carbon dioxide.

An advantage of the SMR technology is that the syngas is very rich in hydrogen with a ratio of hydrogen to carbon monoxide typically greater than 3.0:1. This exceeds the typical syngas ratio of 2.0:1 usually preferred for the Fischer-Tropsch process. As such, a hydrogen separation unit 33 may be used to provide the hydrogen requirement 74 for the GTL process. As discussed previously, well know to those skilled in the art, the hydrogen separator may be a pressure swing adsorption or a membrane separation unit. Further, although the SMR does not require an oxygen source as with the ATR technology, the SMR process requires external heat energy, typically provided by natural gas 13 or optionally by use of the excess refinery gas 76 derived from the FT tail gas 44 or upgrader offgases 56 & 62.

The SMR 25 may contain any suitable catalyst and be operated at any suitable conditions to promote the conversion of the hydrocarbon to hydrogen $H_2$ and carbon monoxide. The addition of steam and natural gas may be optimized to suit the desired production of hydrogen and carbon monoxide. Generally natural gas or any other suitable fuel can be used to provide energy to the SMR reaction furnace. The catalyst employed for the steam reforming process may include one or more catalytically active components such as palladium, platinum, rhodium, iridium, osmium, ruthenium, nickel, chromium, cobalt, cerium, lanthanum, or mixtures thereof. The catalytically active component may be supported on a ceramic pellet or a refractory metal oxide. Other forms will be readily apparent to those skilled.

Figure 3:
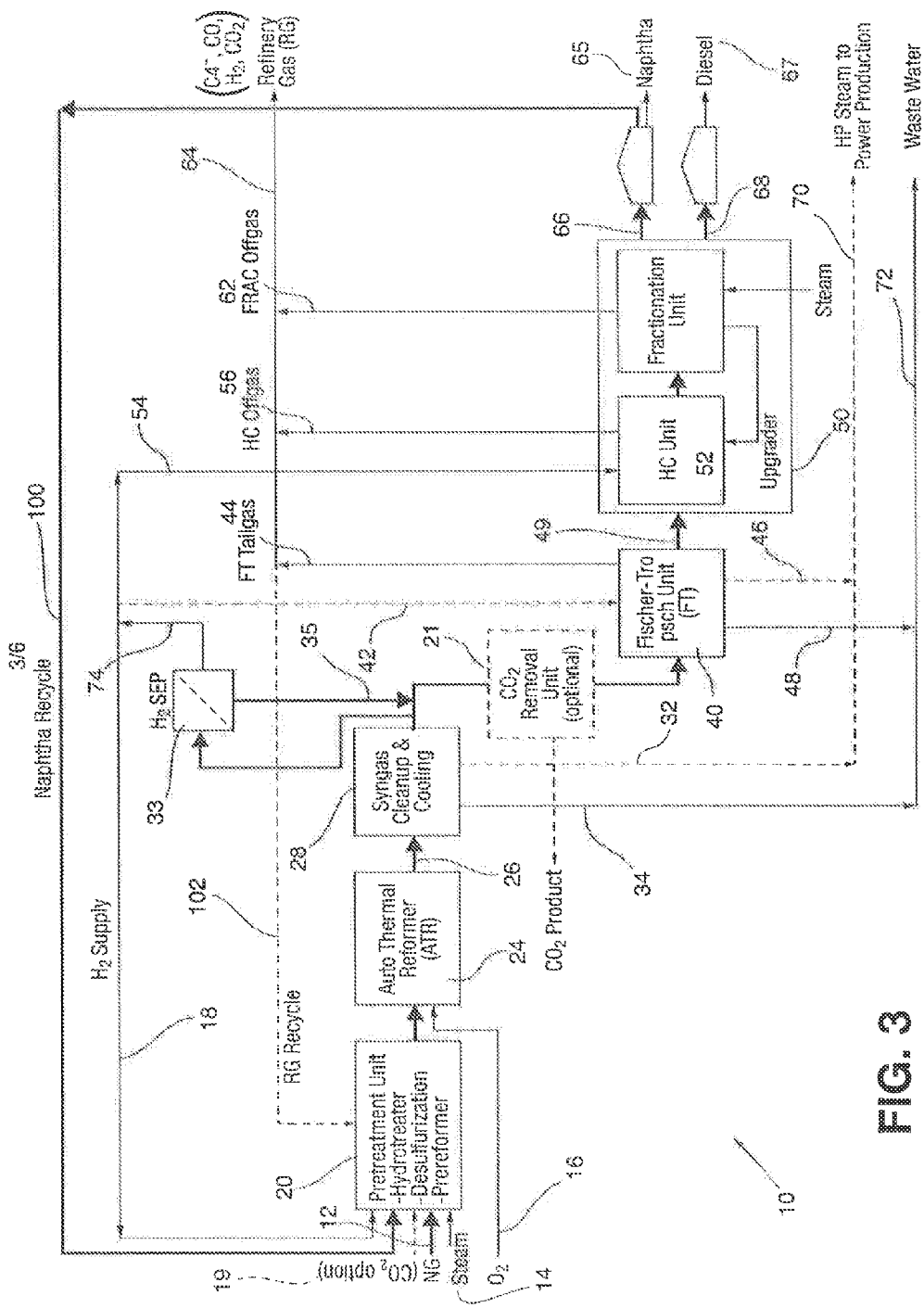
FIG. 3 is a process flow diagram similar to FIG. 1, illustrating a first embodiment of the present invention.

Turning now to FIG. 3, shown is a preliminary embodiment of the technology of the instant invention. As is evinced from FIG. 3, many of the preliminary steps are common with that which is shown in FIG. 1. At least a portion of the less desirable FT product, naphtha 66 is recycled as ATR 24 feed through the pre-treatment unit 20 and is fully destroyed and converted to additional syngas. Based on the full recycle and conversion of the naphtha, the diesel production increase of greater than 10% can be realized, with the elimination of an undesirable by-product stream.

As a key point, one of the most effective procedures in the instant technology, relates to the fact that once the product fractionation stage has been completed and the naphtha 66 formulated, it has been found that by recycle and full conversion of the naphtha, significant results can be achieved in the production of the synthetic diesel.

In the embodiment shown in FIG. 3, several other optional features are desirable in addition to naphtha recycle, to enhance the production of syndiesel, including;
 (i) a hydrogen separation unit is added to remove excess hydrogen from the enhanced syngas for supply to the FT unit 40 and product upgrades 50;
 (ii) A portion of hydrogen rich streams not desired to be used as fuel, separately or combined all together as refinery fuel 64, can be recycled back 102 to the ATR 24 by way of the pre-treatment unit 20;
 (iii) A optional carbon dioxide removal stage 21 may be installed on the FT syngas feedstream to reduce the inert vapour load on the FT unit 40, and at least a portion of the carbon dioxide 12 may be reintroduced into the ATR 24 by way of the pre-treatment unit 20 for purposes of reverse shifting and recycling carbon to enhance the production of syndiesel.

As has been discussed herein previously, it is unusual and most certainly counter-intuitive to effectively destroy the naphtha in order to generate a hydrogen rich stream as the naphtha is commonly desired as primary feedstock for gasoline production. Although this is the case, it is particularly advantageous in the process as set forth in FIG. 3.

Figure 4:
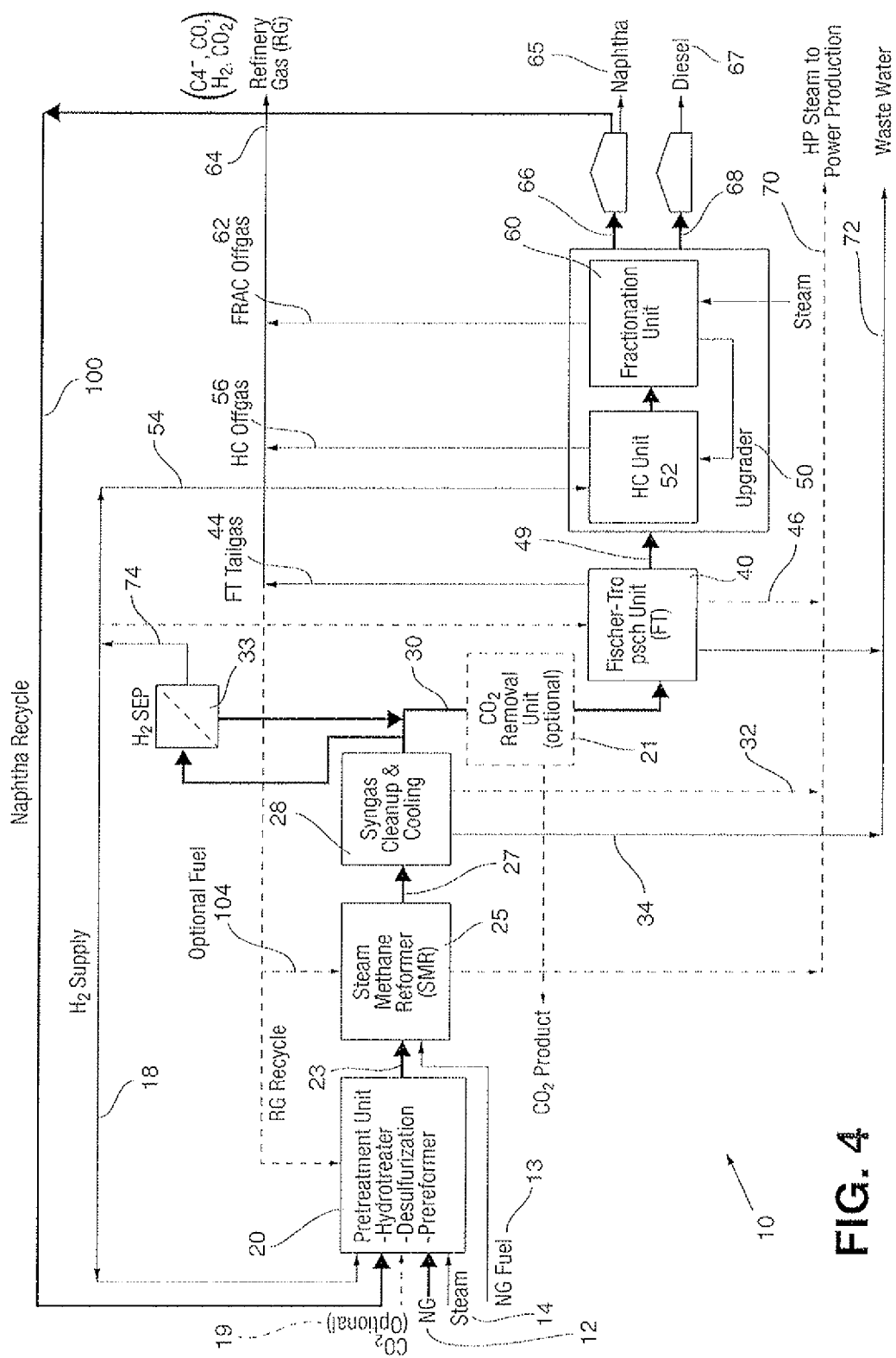
FIG. 4 is a process flow diagram similar to FIG. 2, illustrating a further variation of the present invention.

FIG. 4 sets forth a further interesting variation on the overall process that is set forth in FIGS. 2 and 3. As is evinced from FIG. 4, many of the preliminary steps are common with that which is shown in FIG. 2. In this variation, and similar to the variation described by FIG. 3, the process employs the recycle of at least a portion of the naphtha 100 to enhance the production of syndiesel using a SMR syngas generator. Similarly the optional features described for FIG. 3 can equally apply to FIG. 4.

Figure 5:
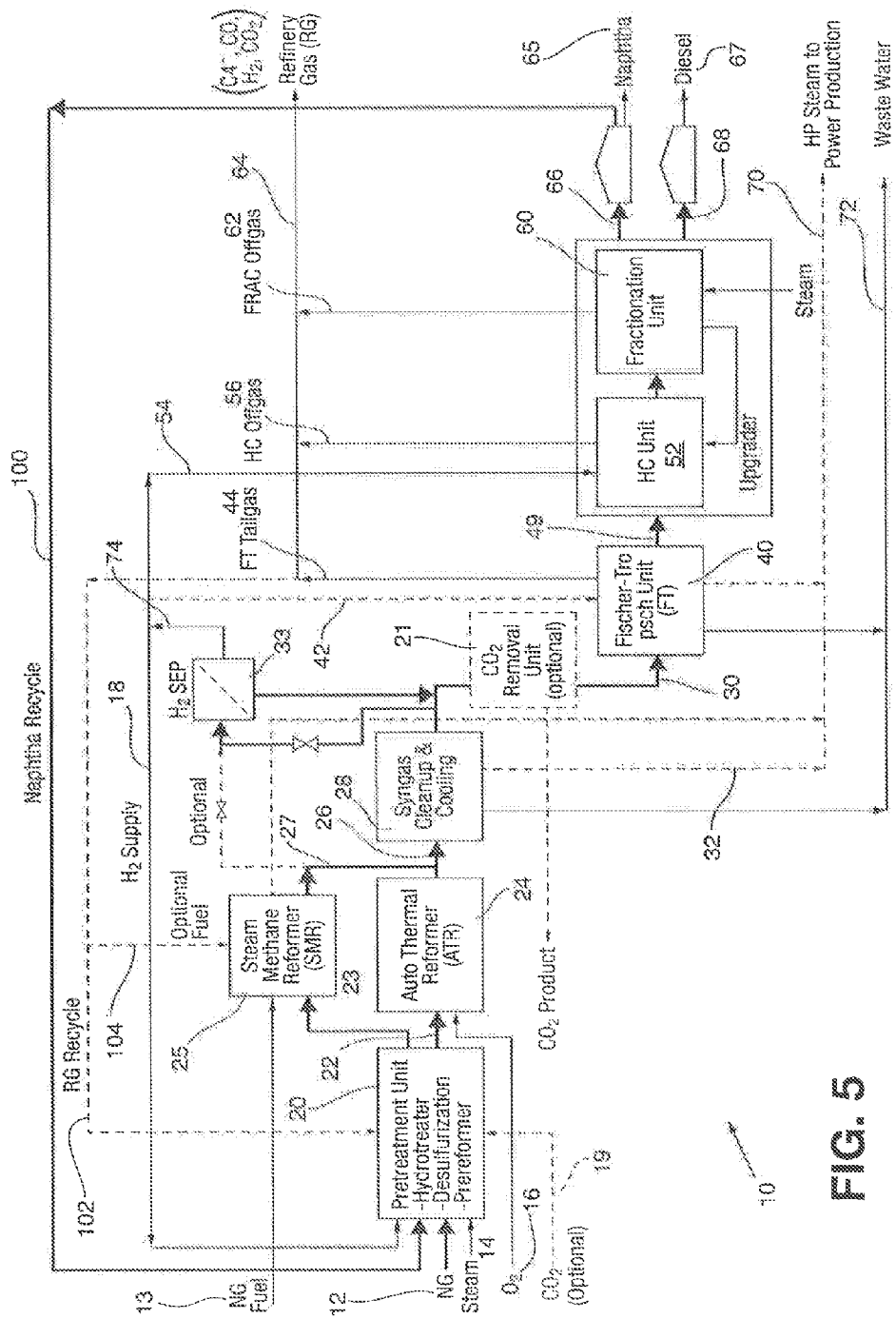
FIG. 5 is a process flow diagram of a still further embodiment of the present invention showing the combination of autothermal and steam methane reforming technologies.

A further variation of the overall process embraced by the technology discussed herein is shown in FIG. 5. In essence, the process flow as shown in FIG. 5 combines the unit operations of the SMR 25 and the ATR 24 syngas generators with the primary embodiment of this invention, namely the recycle of at least a portion of the naphtha, to create the maximum conversion of carbon to syndiesel. Further, the optional features as described in FIGS. 3 and 4, combined with the naphtha recycle, may create even further benefits to further enhancement of syndiesel production without any nonuseful by-products. The sizing of the ATR and SMR syngas generators are specific to each feed gas compositions and site specific parameters to optimize the production of syndiesel. Further the feedstreams for the ATR and SMR may be common or uniquely prepared in the pre-treatment unit to meet specific syngas compositions desired at 26 and 27. Similarly, the hydrogen rich syngas stream or portion thereof, from the SMR can be optionally preferred as the feed stream to the hydrogen separation unit 33. By way of example, the preferred steam to carbon ratios at streams 22 and 23 for the ATR and SMR may be different, thereby requiring separate pre-treatment steps.

Figure 6:
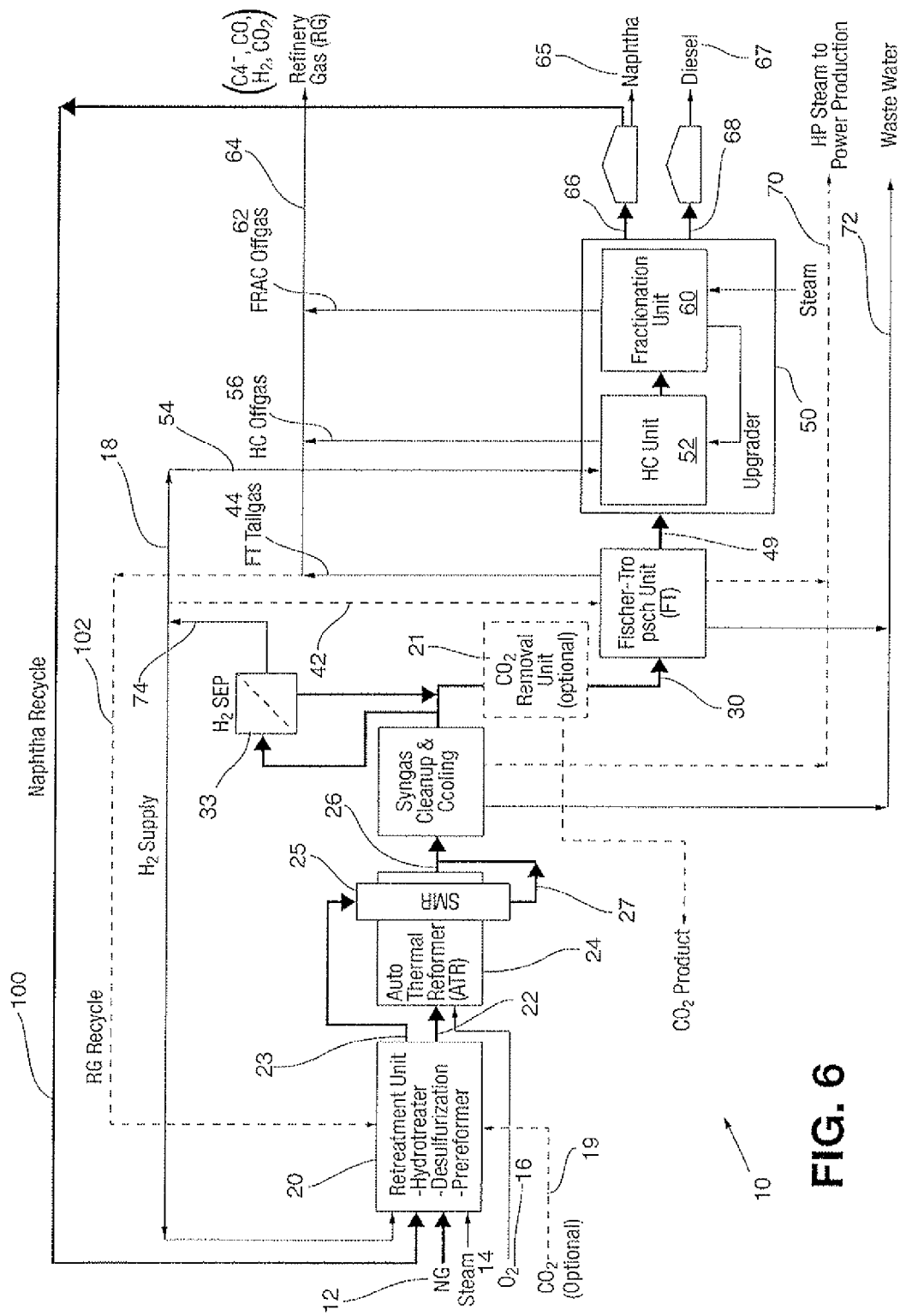
FIG. 6 is a process flow diagram illustrating a still further variation of the present methodology, showing the integration of the autothermal and steam methane technologies.

Turning to FIG. 6, as shown is yet another variation of the overall process according to the present invention combining the benefits of FIGS. 3 and 4. In this embodiment, both the SMR and ATR unit operations, combined with the naphtha recycle are amalgamated into an integrated unit operation whereby the heat energy created by the ATR 24 becomes the indirect heat energy required by the SMR reactor tubes 25. This embodiment allows the integrated ATR/SMR unit, the XTR to be strategically designed to maximize the carbon conversion to syndiesel by creating the optimum Fischer-Tropsch 40 and hydrogen separator 33 syngas feed with optimum hydrogen to carbon monoxide ratio and the minimum quantity of natural gas, steam and oxygen, while maximizing syndiesel production without the production of any nonuseful by-product. All other optional features remain the same as FIGS. 3, 4 and 5. As used herein, "integrated" in reference to the ATR/SMR means a merged unit where the two distinct operations are merged into one.

Although embodiments of the invention have been described above, it is not limited thereto and it will be apparent to those skilled in the art that numerous modifications form part of the present invention insofar as they do not depart from the spirit, nature and scope of the claimed and described invention.

I claim:

1. A process for synthesizing hydrocarbons, comprising the steps of:
   (a) formulating a hydrogen rich stream with a syngas generator;
   (b) catalytically converting said stream to produce the hydrocarbons, containing at least naphtha;
   (c) recycling at least a portion of said naphtha to said syngas generator to form an enhanced hydrogen rich stream; and
   (d) re-circulating said enhanced hydrogen rich stream from step (c) for conversion in step (b) to enhance the synthesis of hydrocarbons.

2. The process as set forth in claim 1, wherein conversion is achieved using Fischer-Tropsch reactor.

3. The process as set forth in claim 1, wherein an auxiliary source gas comprising of hydrogen is added to said syngas generator.

4. The process as set forth in claim 1, wherein the naphtha is generated in addition to heavier hydrocarbons, light hydrocarbons and a refinery fuel.

5. The process as set forth in claim 1, wherein said syngas generator comprises a steam methane reformer (SMR).

6. The process as set forth in claim 1, wherein said syngas generator comprises an autothermal reformer (ATR).

7. The process as set forth in claim 1, wherein said syngas generator comprises a combination of an autothermal reformer and a steam methane reformer.

8. The process as set forth in claim 1, wherein said syngas generator comprises a merged unit having an autothermal reformer merged in a single unit with a steam methane reformer (XTR).

9. The process as set forth in claim 4, wherein at least a portion of the refinery fuel from step (d) is selected from the group consisting of tail gas from a Fischer-Tropsch unit, offgas from a hydrocarbon upgrades unit or a combination thereof.

10. The process as set forth in claim 3, wherein said auxiliary source comprises natural gas.

11. The process as set forth in claim 4, further including the step of separating at least a portion of said heavier hydrocarbons from said naphtha.

12. The process as set forth in claim 1, further including the step of treating a portion of said hydrogen rich stream in a hydrogen purification unit.

13. The process as set forth in claim 12, wherein said hydrogen purification unit comprises a pressure swing adsorption or membrane unit.

14. The process as set forth in claim 1, wherein said hydrogen rich stream from said syngas generator is treated to a carbon dioxide removal operation prior to catalytic conversion.

15. The process as set forth in claim 1, wherein the catalytically converted stream is treated to a hydrocarbon upgrading operation.

16. The process as set forth in claim 1, wherein energy recovered from said syngas generator is used in the production of power.

17. The process as set forth in claim 1, wherein energy recovered from the catalytic conversion of said hydrogen rich stream is used in the production of power.

18. A process for synthesizing hydrocarbons, comprising the steps of: providing a source of hydrocarbons at least containing naphtha, recycling said naphtha to a syngas generator to form hydrogen rich stream; and catalytically converting said hydrogen rich stream to synthesize the hydrocarbons.

19. The process as set forth in claim 18, further including the steps of providing a syngas generator comprising a merged ATR and SMR.

20. The process as set forth in claim 19, further including the step of balancing feedstreams to each of said ATR and SMR for optimizing hydrocarbon synthesis yield.

21. The process as set forth in claim 20, further including the step of employing recycled gas to offset the natural gas load fed to said SMR.

* * * * *